United States Patent [19]

Anderl et al.

[11] Patent Number: 4,816,654

[45] Date of Patent: Mar. 28, 1989

[54] IMPROVED SECURITY SYSTEM FOR A PORTABLE DATA CARRIER

[75] Inventors: Ewald C. Anderl, Middletown; Oren Frankel, Ocean Township, Monmouth County; Avi Zahavi, Highland Park, all of N.J.

[73] Assignees: American Telephone and Telegraph Company, New York, N.Y.; AT&T Information Systems Inc., Morristown, N.J.

[21] Appl. No.: 863,973

[22] Filed: May 16, 1986

[51] Int. Cl.$^4$ .................. G06F 15/30; G06K 19/06
[52] U.S. Cl. ................... 235/380; 235/379; 235/382; 235/382.5; 235/492; 340/825.33; 902/26
[58] Field of Search .............. 340/825.31, 825.33, 340/825.34; 235/380, 382, 382.5, 375, 376, 436, 438, 492, 494, 379, 431; 364/401, 408, 200, 900; 902/25, 26

[56] References Cited

U.S. PATENT DOCUMENTS

| | | | |
|---|---|---|---|
| 3,906,460 | 9/1975 | Halpern | 364/900 |
| 3,941,977 | 3/1976 | Voss et al. | 235/381 |
| 4,007,355 | 2/1977 | Moreno | 235/492 |
| 4,095,739 | 6/1978 | Fox et al. | 235/382 |
| 4,211,919 | 7/1980 | Ugon | 235/487 |
| 4,271,482 | 6/1981 | Giraud | 364/900 |
| 4,439,670 | 3/1984 | Basset et al. | 235/382 |
| 4,532,507 | 7/1985 | Edson et al. | 340/825.31 |
| 4,572,946 | 2/1986 | Schrenk | 235/492 |
| 4,650,975 | 3/1987 | Kitchever | 235/380 |
| 4,660,168 | 4/1987 | Grant et al. | 235/379 |
| 4,683,372 | 7/1987 | Matsumoto | 235/492 |
| 4,692,604 | 9/1987 | Billings | 235/493 |

FOREIGN PATENT DOCUMENTS 057602 8/1982 European Pat. Off. .
0152024 8/1985 European Pat. Off. .
0159539 10/1985 European Pat. Off. .
0190733 8/1986 European Pat. Off. .

OTHER PUBLICATIONS

Radio Shack Portable Reference Guide, TRS-80 Model 4P, 1983 pp. 1 and 4-7.
*Scientific American*, "Smart Cards", by Robert McIvor, Nov. 1985 pp. 152-159.

Primary Examiner—Alan Faber
Assistant Examiner—Robert A. Weinhardt
Attorney, Agent, or Firm—Samuel R. Williamson

[57] ABSTRACT

A portable data carrier system provides improved security for files which support multiple applications, from custom repertory dialing to storage of individual medical and/or banking records. Included in the system is a portable data carrier which looks and feels much like an ordinary credit card. The portable data carrier, however, includes a computer and an electrically erasable field programmable read-only memory. Power for operation of the portable data carrier is provided from an associated station via a reader/writer. The reader/writer also couples data between the data carrier and the associated station. Operation of the data carrier is through an executive operating system that is accessed from the station via a set of commonly understood command primitives. These command primitives manipulate the files in the data carrier in accordance with security requirements. Security is enhanced since the stations's application software receiving and interpreting the data from a file sees a contiguous stream of bytes relating only to the file of the application being accessed. No information is provided to a user of a particular application about other applications in the data carrier or about the data carrier's internal file structure.

9 Claims, 11 Drawing Sheets

FIG. 2

| SECURITY LEVEL | USER |
|---|---|
| 6 | DEVELOPER |
| 5 | SUPER USER (FACTORY) |
| 4 | MASTER ISSUER (OWNER) |
| 3 | SUB ISSUER |
| 2 | USER (CARD HOLDER) |
| 1 | PUBLIC (CARD OWNER INFO) (MEDICAL DATA) |

FIG. 5

| SECURITY LEVEL | USER | FEATURE PER FILE |
|---|---|---|
| 4 | MASTER ISSUER (OWNER) | OPTIONAL PASSWORD |
| 3 | SUB ISSUER | OPTIONAL PASSWORD AND APPEND ONLY |
| 2 | USER (CARD HOLDER) | OPTIONAL PASSWORD AND APPEND ONLY |
| 1 | PUBLIC (CARD OWNER INFO) (MEDICAL DATA) | OPTIONAL PASSWORD AND APPEND ONLY |

FIG. 6

| COMMAND PRIMITIVES | DEVELOPER | SUPER USER | MASTER ISSUER | SUB ISSUER | USER | PUBLIC |
|---|---|---|---|---|---|---|
| CREATE | X | X | X | X | X | X |
| DIRECTORY | X | X | X | X | X | X |
| FORMAT | X | X | X | | | |
| INFO | X | X | X | X | X | |
| LOCK | X | X | X | X | X | |
| LOGIN | | | X | X | X | |
| MARK-EOF | X | X | X | X | X | X |
| OPEN | X | X | X | X | X | X |
| PASSWORD | X | X | X | X | X | |
| READ | X | X | X | X | X | X |
| REMOVE | X | X | X | X | X | X |
| RESET | X | X | X | X | X | X |
| SEEK | X | X | X | X | X | X |
| SPACE | X | X | X | X | X | X |
| STATUS | X | X | X | X | X | X |
| UNLOCK | X | X | X | X | X | |
| WRITE | X | X | X | X | X | X |

IMPROVED SECURITY SYSTEM FOR A PORTABLE DATA CARRIER

BACKGROUND OF THE INVENTION

1. Technical Field

This invention relates to a system for operation of portable data carriers such as smart cards, and more particular to a system for the transfer and exchange of data between a carrier and an associated station.

2. Description of the Prior Art

The use of credit cards for purchases and for banking and other transactions has become so popular that most travelers today do so with very little cash. The card, typically made of plastic embossed with an account number and the name of the account owner, serves solely to identify an authorized account at a bank or credit house to be charged for a transaction. A magnetic stripe on the back of some cards contains the same information, but is machine-readable to speed the transaction. All accounting information is stored at the bank or credit house.

In that transactions generally occur at a location remote from the bank or credit house, it is easy for a person to use a misappropriated card, or for a legitimate owner to inadvertently exceed his credit limit. Most merchants, therefore, require that before purchases above a relatively modest amount such as $50.00 are completed, the authorization must be verified with the bank or credit house as appropriate. Even with automatic telephone dialing, the procedure is cumbersome and time-consuming. Furthermore, a separate card is needed for each account.

With the advent of recent advances in microelectronics, however, it is now possible to put a vast amount of computing power and memory right in the card to produce a "smart card" or "portable data carrier". The card could carry the account numbers of all of the owner's charge accounts, the balances of all of the accounts, the credit limits of all of the accounts and be updated with each transaction. The card could also carry other such personal data as, for example, the sizes of family members for clothing purchases, personal telephone directories, etc. The types of personal data are limited only by one's imagination.

The technology for putting all of this on the standard size card is here. What still remains, however, is the problem of providing suitable security for the data on the card. Such rules of security require limiting access to the internal file structure of the card while still allowing easy access to the data contained therein for authorized users.

SUMMARY OF THE INVENTION

In accordance with the invention, a high security portable data carrier system may be used in a variety of applications, from custom repertory dialing to storage of individual medical and/or banking records. Included in the system is a portable data carrier or smart card which looks and feels much like an ordinary credit card. The card, however, includes a computer, an electrically erasable programmable read-only memory (EEPROM), and also circuitry for receiving a combined power and timing signal from a card reader/writer collocated with an associated station. These card components and circuitry also receive and transmit data signals between the card and, via the reader/writer, the associated station.

The card runs an executive operating system that is accessed from the station via a set of commonly understood command primitives. These command primitives manipulate the card file system in accord with rules required by card security. Use of the executive operating system prevents an intruder from gaining access to the data base in the card. In addition, encryption of data as it is provided to the card is also available for those particular sensitive applications.

A customer's personal information resides in multiple files in the EEPROM on the card. Appropriate application software residing in the station, when accompanied by an appropriate password, enables the retrieval and modification of these files. Security for the card is provided by requiring a separate password for gaining access to each of designated levels of interaction between the card and the associated station. The number of consecutive unsuccessful login attempts is limited to a specified number for each security level. When this number is exceeded the card can be configured either to lock at that security level, or to erase the database of the entire card. If the card is configured to lock, any level above the locked level is able to unlock it. This permits a dispersal of card maintenance to the lowest level possible above the locked level. And security is further enhanced since the card also requires a user to provide an optional password before access to certain designated files is permitted.

Since each one of the multiple files may have its own file security on the card, multiple applications or separate accounts may exist in these files without conflict or confusion. The maximum number of files permitted on the card is limited only by the memory available on the card.

A user logged on at a particular security level is allowed to change the password at that level or any level below it. Thus, if a password is lost or forgotten, it can be re-written by logging into the card at a higher security level and accessing a password command. In this way the lost password need not be recovered.

A high level software library is provided to support all interactions between the station and the reader/writer or card. As a result, an application programmer does not need to be familiar with the tedious details of the card internals or communication protocol. His code interfaces directly with the library and the library interfaces with the card.

The library is divided into four sections: a card library section which provides for direct mapping of card commands, a card reader/writer library section which provides for direct mapping of reader/writer commands, a compound library section which contains card and/or reader/writer commands, and finally a control section which contains common control functions located on the station. These functions include details of initialization, termination and control of ports and logical devices. This library thus functions as a software interface and provides a way to access devices and files that closely resembles typical computer protocols and eases the burden on the application programmer. Security is enhanced since the station's application software receiving and interpreting the data from a file sees only a contiguous stream of bytes relating to the application being accessed. No information is thus provided to a user of a particular application about other applications in the card or about the card internal file structure.

BRIEF DESCRIPTION OF THE DRAWINGS

The invention and its mode of operation will be more clearly understood from the following detailed description when read with the appended drawing in which:

FIG. 2 is a table showing six security levels for which access is available to the portable data carrier employed in the system of FIG. 1;

FIG. 5 illustrates the hierarchical structure of the Normal Security Class Levels which employ an optional password per file and an append-only feature;

FIG. 6 is a table showing command primitives used in communicating with the operating system on the portable data carrier;

Throughout the drawings, the same elements when shown in more than one figure are designated by the same reference numerals.

DETAILED DESCRIPTION

Figure 1:
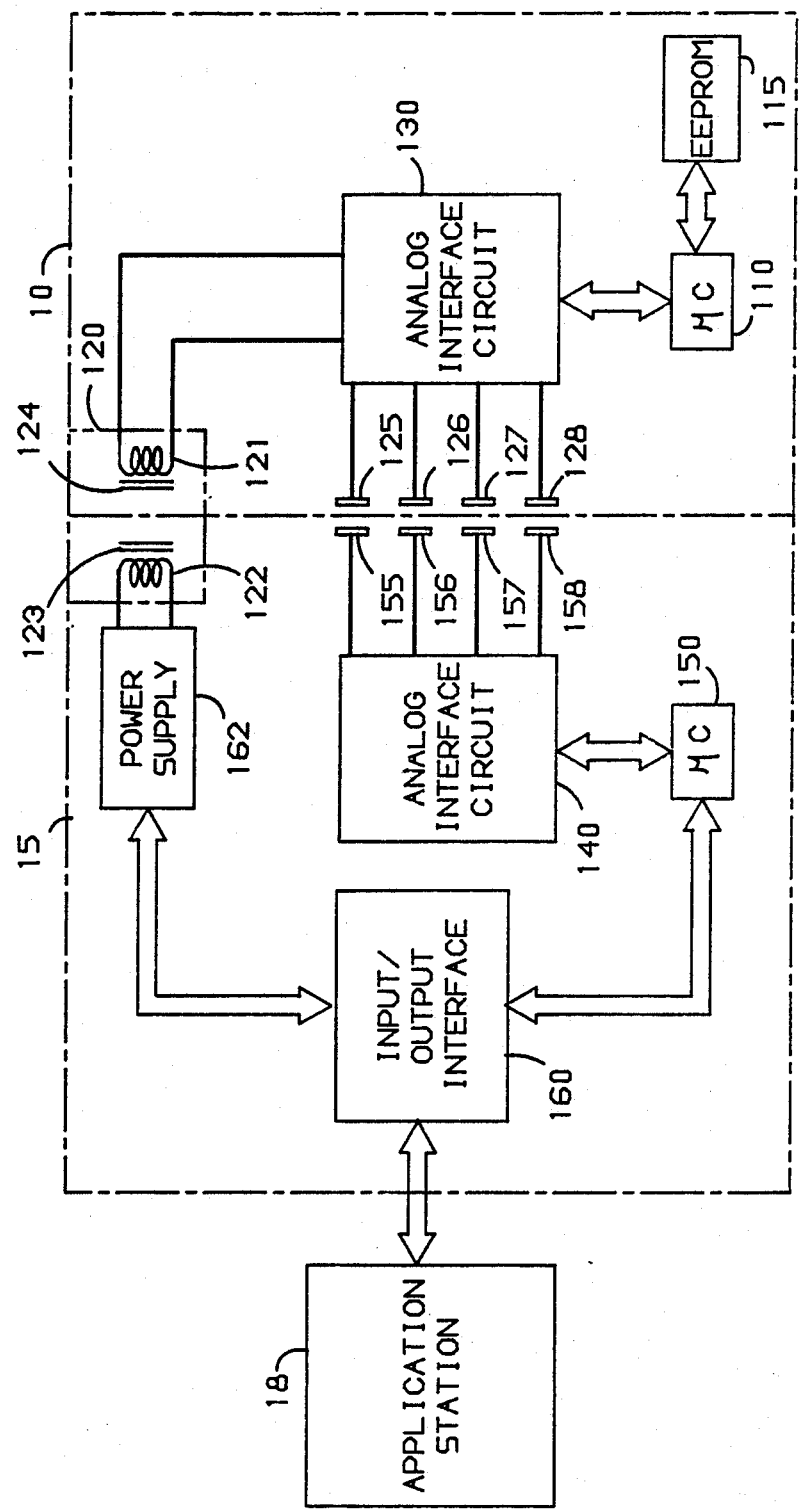
FIG. 1 is a functional block representation of the major functional components of a portable data carrier system and their general interconnection with each other.

With reference to FIG. 1, there is shown a portable data carrier (PDC) system which for ease of understanding may be divided into three subsystems. The first of these is a portable data carrier or card 10 which contains a memory capable of storing and updating information for a user. The second subsystem is a card reader/writer 15 which links the card with a station 18, the third subsystem. This last subsystem is a suitably configured application station which comprises a computer or dedicated workstation that runs application software necessary for accessing the memory in the card. The application software resides in the station and enables the retrieval and modification of information stored in the memory of the card 10.

The card 10 runs an executive operating system that is accessed via a set of operating system command primitives. These command primitives manipulate a file system on the card in accordance with rules required by card security.

Some of the principle components located in the card 10 are a microcomputer 110, an electrical erasable programmable read-only memory (EEPROM) 115, an analog interface circuit 130, the secondary winding 121 of a transformer 120, and capacitive plates 125 through 128.

The microcomputer 110 includes a central processing unit and memory units in the form of random-access memory and read-only memory. A microcomputer available from Intel Corporation as Part No. 80C51 may be used for microcomputer 110 with the proper programming. Operating under firmware control provided by its internal read-only memory, the microcomputer 110 formats data that is transferred directly to the EEPROM 115 and via the reader/writer 15 to the station 18. The entire EEPROM or a portion of it may be an integral part of the microcomputer, or it may be a separate element. The microcomputer 110 also interprets the command primitives from the station 18 received through the reader/writer 15.

By employing EEPROM 115 in the card 10, an authorized user has the ability to reprogram certain application files in the memory section of the card while at an authorized associated application station with new and different data as desired. EEPROMS are available from a number of suppliers, many of whom are mentioned in an article entitled "Are EEPROMS Finally Ready To Take Off?" by J. Robert Lineback, Electronics, Vol. 59, No. 7, (Feb. 17, 1986), pp. 40–41. Data may be written to and read or erased from an EEPROM repeatedly while operating power is being applied. When operating power is removed, any changes made to the data in the EEPROM remain and v are retrievable whenever the card 10 is again powered.

The analog interface circuit 130 provides a means for interfacing the memory card 10 to the reader/writer 15. This interface performs a multitude of functions including providing operating power from magnetic energy coupled from the reader/writer 15 to the card 10, and also coupling data between the reader/writer 15 and the microcomputer 110 in the card 10. Power for operating the card 10 is provided to the analog interface circuit 130 via an inductive interface provided by the secondary winding 121 of a transformer 120. This transformer is formed when this secondary winding in the card 10 is mated to a primary winding 122 in the reader/writer 15. The station 18 provides the source of power for operation of both the reader/writer 15 and the card 10.

The transformer 120 may advantageously include a ferrite core 123 in the reader/writer for increased coupling between the transformer primary winding 122 and secondary winding 121. A second such core 124 may also be included in the transformer 120 and associated with the secondary winding 121 in the card for a further increase in coupling efficiency. In those arrangements where ample power is available and efficiency is not a consideration, one or both of these cores may be omitted. The use of a transformer for coupling power into a credit card was proposed by R. L. Billings in U.S. Pat. No. 4,692,604 entitled "Flexible Inductor", issued Sept. 8, 1987 and commonly assigned with this application to the same assignee.

Data reception to and transmission from the card 10 are provided by a capacitive interface connected to the analog interface 130. This capacitive interface comprises four capacitors formed when electrodes or plates 125 through 128 on the card 10 are mated with corresponding electrodes or plates 155 through 158 in the reader/writer 15. Two of these capacitors are used to transfer data to the card 10 from the reader/writer 15 and the remaining two are used to transfer data to the reader/writer 15 from the card 10. The combination of the inductive interface and the capacitive interface provides the complete communication interface between the reader/writer 15 and the memory card 10.

The organization of some of the components in the reader/writer 15 functionally mirror those in the card 10. Such components are, for example, an analog interface circuit 140 and a microcomputer 150. In addition, the reader/writer 15 also includes a power supply 162 and an input/output interface 160. The power supply 162 is used to provide power and also to couple a clock signal from the reader/writer 15 to the card 10 through the transformer 120. The input/output interface 160 is principally a universal asynchronous receiver transmitter (UART) and may be advantageously included in the microcomputer 150. This UART communicates with the application station 18, which could be an office editing station, factory editing station, issuer editing station, public telephone station or other suitably configured station.

The security concerns for the PDC system is divided into two broad areas. The first area is directed to aspects of identification and authentication, to insure that the station is both (1) communicating with an authentic card and (2) communicating with an authentic application file on the card. The second area is directed to controlling access to files on the card and limiting the exercise of card commands by an application at the station, an application being an account, or the like, which accesses specific data in a file on the card.

Without a suitable authentication procedure, those with the intent of defrauding the system might be able to simulate the protocol at the station thereby gaining information about the PDC system.

A method of insuring that the station is communicating with an authentic file on an authentic card is achieved by assigning each card a unique serial number and using this number, or subset thereof, along with a concealed application password residing in the station. These numbers are manipulated algorithmically to produce an authentication code which is stored in the application's file on the card at the time of creation. During subsequent transactions, this code must be favorably compared to a similar code generated independently by the station.

In order to provide security protection for the card file system and the card commands, and yet allow for flexibility in handling different types of applications, the card employs six different security levels. These security levels enable the card to protect two types of resources: the card file system and the card commands. Access to any of these resources is a function of the authorized login level, the command requested, the file to be accessed, and such additional restrictions as are imposed by the owner of the card.

Referring now to FIG. 2, there is shown these six login security levels. The first four lower levels are placed in a Normal Security Class category and are available for use in a public environment. The first and lowest level in the hierarchical security level is a PUBLIC login level for general information and does not require a password for access. Medical information and insurance identification numbers or library card information are examples of public data that a person might want to include at this level. When the card is initialized on power-up or reset at a station, it comes up at the PUBLIC login level.

The second level is the USER level and requires a user's password for access. A user may have certain credit and debit accounts at this level. The third level is the SUB ISSUER level which also requires a password for access and is generally the level used in an application licensed by the MASTER ISSUER or the owner of the card.

The fourth level of security is that retained by the MASTER ISSUER. It is at this level that the card is formatted and from which it is issued. An example of how these levels may be utilized is as follows: a bank issues cards containing credit or debit accounts. This bank also licenses the use of its card to retail vendors who establish their own credit or debit accounts on the card. The bank in this example is the MASTER ISSUER and the vendors are SUB ISSUERS. The card holder, of course, is the USER. Each account in this example is handled by a separate file on the card and only persons or programs with the proper credentials for a particular file may access that file at an appropriate application station.

The two top security levels, DEVELOPER and SUPER USER are placed in an Extended Security Class category which permits the use of commands that are not available to the levels in the Normal Security Class category.

The fifth level or SUPER USER level is the factory which is responsible for construction, testing, and initializing blank cards in such a way that security is facilitated and misappropriated blank cards may not be used.

Finally the sixth and highest level is the developer level of the card. Both the SUPER USER and DEVELOPER security levels are capable of accessing the entire contents of the card file system including the card system header, to be discussed in greater detail later herein.

Since multiple files each with their own credentials exist on the card, multiple applications may respectively exist in these separate files without conflict or confusion. It is easy to visualize a person having 10 or more separate credit or debit accounts, an electronic checkbook, and a security pass for access to his apartment, all on the same card. The issuers as well as the user need have little fear of the consequences of misappropriation since the card requires a user to identify himself by means of a password before access to files other than those at the public level is permitted.

Figure 3:
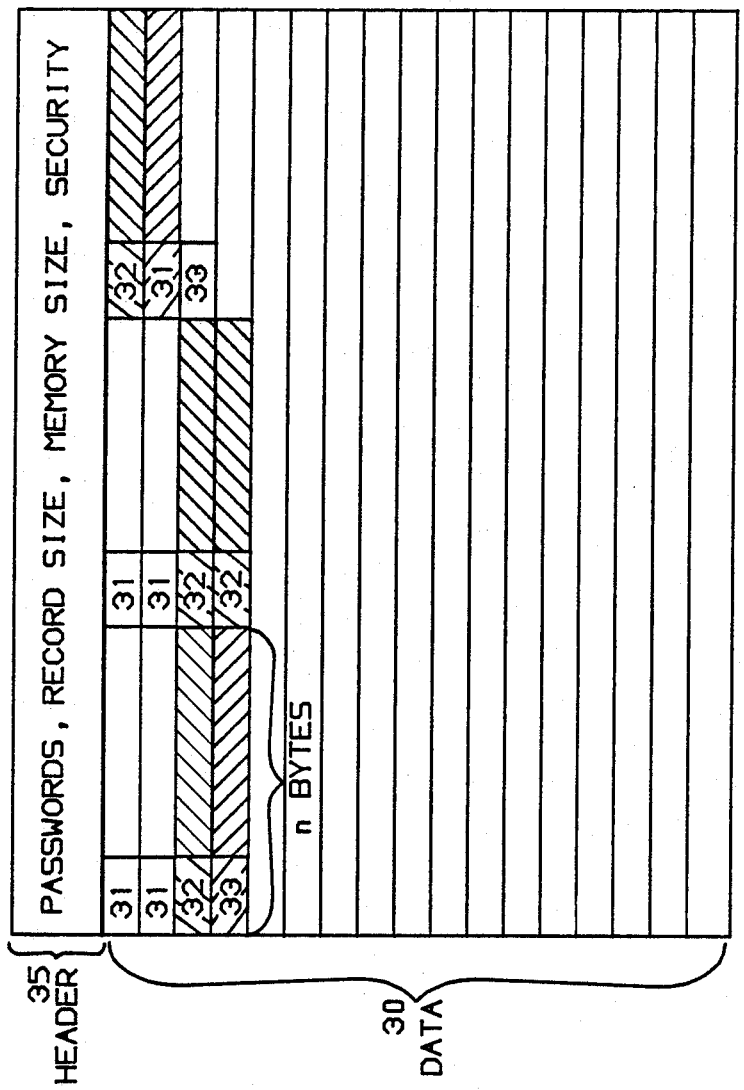
FIG. 3 illustrates the file system for data contained in the portable data carrier which is segmented into two regions, the header and the data segment.

Referring now to FIG. 3, there is shown the card file system which is segmented into two regions, the header which is the administration portion and the data segment that contains the application files.

The high security header 35 contains information such as the card serial number, the passwords for each login level, the number of unsuccessful password attempts for each level, a lock byte for indicating login levels are locked, size of the fixed records in the database and memory size in kilobytes of the EEPROM 115. Direct access to the header section is available only to the two top security levels.

The data segment 30 of the card is divided into fixed records whose lengths of n bytes are set by the MASTER ISSUER. Each utilized record 31, 32, 33 is assigned to a particular file. Identification of the appropriate file is through the first byte of each record which is assigned that file's identification number.

The card has no file Directory and there are no pointers between the different records of the same file. File data order is indicated not by contiguous records but by linear order. The operating system of the card scans the address in the EEPROM from the lowest to the highest address. The first record located with a particular file identification number is the first record in that file, and the last record located with that file's identification number is the last record in that file. The card operating system reads the records of a file as each record in the particular file is encountered. The maximum size and number of files permitted on the card is limited only by the size of the memory in the EEPROM. A station's application software reading a file sees only a contiguous stream of bytes which is independent of the card internal file structure.

Figure 4:
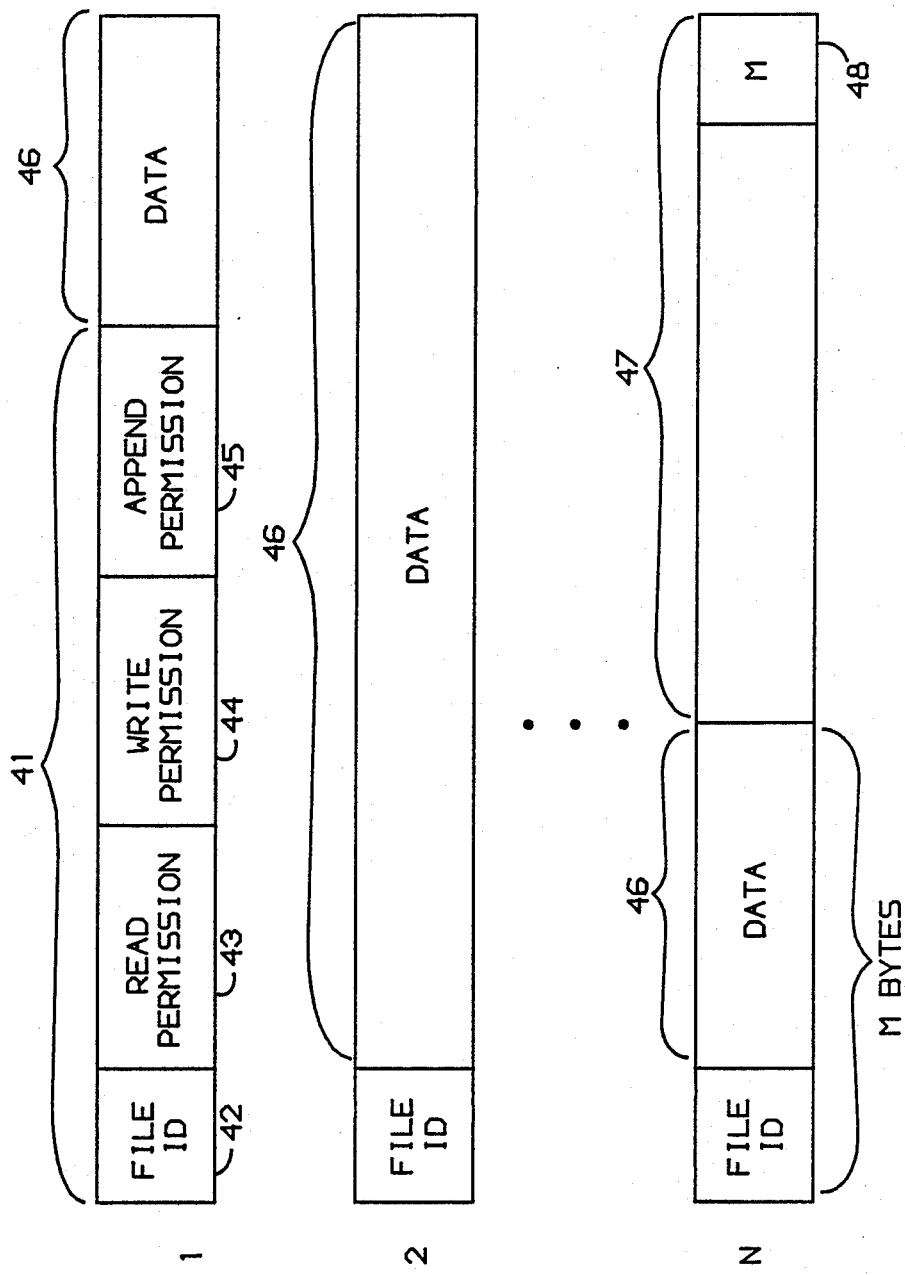
FIG. 4 illustrates the three sections of each file located in the data segment region of a portable data carrier system.

Referring next to FIG. 4, there is shown in greater detail the three sections of each file in the data segment region of a card file system. A prefix section 41 which is located in the first record of each file contains the file identification number 42 and protection bytes 43, 44 and 45. The file identification number is a number between between 1 and hex FE, inclusive. Hex number 00 and hex number FF are reserved for respectively indicating an unused record and the end of available memory in the EEPROM.

The protection bytes 43 through 45 specify the file permissions. The first byte 43 represents read permission designating the minimal level at which the file may be read, and the second byte 44 represents read/write permission designating the minimal level at which the file may be both read and written into.

Thus read permission for a file is separable from read/write permission for a file. Different security levels may also be specified for the read verses the read/write access. For example, the read permission for a file may be at PUBLIC level allowing public access to public information, but the write permission could be specified at USER level which prohibits writing to the file without the user's consent.

With reference briefly to FIG. 5, there is shown the hierarchical structure of the Normal Security Class levels which may employ optional passwords and an append-only feature. For increased flexibility in the use of the card, each file on the card may include in its protection bytes a requirement that an optional password be provided before allowing access to a particular file. This is in addition to the requirement that a user has to be at the required security level of the card's operating system for gaining access to a file protected to that level. Thus, by way of example, a file with read/write permissions for a user which includes an optional write password requires (1) logging into the card at user level and (2) opening the file in order to read it. To write to this file, however, the user must (1) log into the card at user level and (2) open the file for 'write' by providing the optional password. This does not apply to a person logging in at a higher level than the access permissions of a file require. A person logging in at such a level may gain access to that file even though an optional password is required at the designated security level.

The hierarchical structure of the Normal Security Class levels is such that the MASTER ISSUER is able to read and write to any file at and beneath its level; the SUB ISSUER is able to read and write to any file at and beneath its level. Similarly, the card holder is able to read and write to any file at its level or the public level.

In an application where it is deemed appropriate, the protection byte 45 in FIG. 4 may be set to implement an 'append-only' mode which permits the user to only add data to a file but not overwrite existing data. Records reflecting the appropriate application file are created for accepting this data as it is entered. Thus a file may be designated for read/append permission as well as read/write permission.

An information section 46 of a file contains the actual data located in each record of that file. And a suffix section 47 with a number M in the last byte 48 of the last record N indicates the number of application data bytes in that last record.

The executive operating system on the card is accessed by the Normal Security Class levels through use of the commonly understood command primitives shown in FIG. 6. These command primitives control the security access for the card, file creation and access and also administrative and testing activities. Additional command primitives are available for the SUPER USER or DEVELOPER login levels.

Operation of these command primitives may be illustrated through a description of the operation of the 'login' command. In order to log into the card, the user is required to specify a login level and a password. This password is checked internally by the card algorithmically against the appropriate password at the same login level in the card header. If a card user is attempting to gain access to a file with a login level lower than that required by the file, permission to open the file either for read or for read/write is denied.

The passwords for each security level are placed in the card header when the card is manufactured. The password command allows the user at a logged on security level to change the password of its level or any level below it. Thus, if a password is lost or forgotten, it can be re-written by logging into the card at a higher security level and using the password command. In this way the lost password need not be recovered.

The number of consecutive unsuccessful 'login' attempts per security level is limited to a specified number. When this number is exceeded the card can be configured either to lock at that security level, or to erase the database of the entire card. If the card is configured to lock, any level above the locked level is able to unlock it. This permits a dispersal of card maintenance to the lowest level possible above the locked level. The number of failures is recorded in the header portion of the EEPROM, in an appropriate "password failure counter".

It is also possible to protect a file which requires an optional password. Files may be individually protected in the same manner as the card by setting a bit for erasing that file in the file protection bytes, if desired. Thus a person attempting to open a file which requires an optional password will only have a certain number of attempts before locking of the card or erasure of the data in that file occurs.

Figure 7:
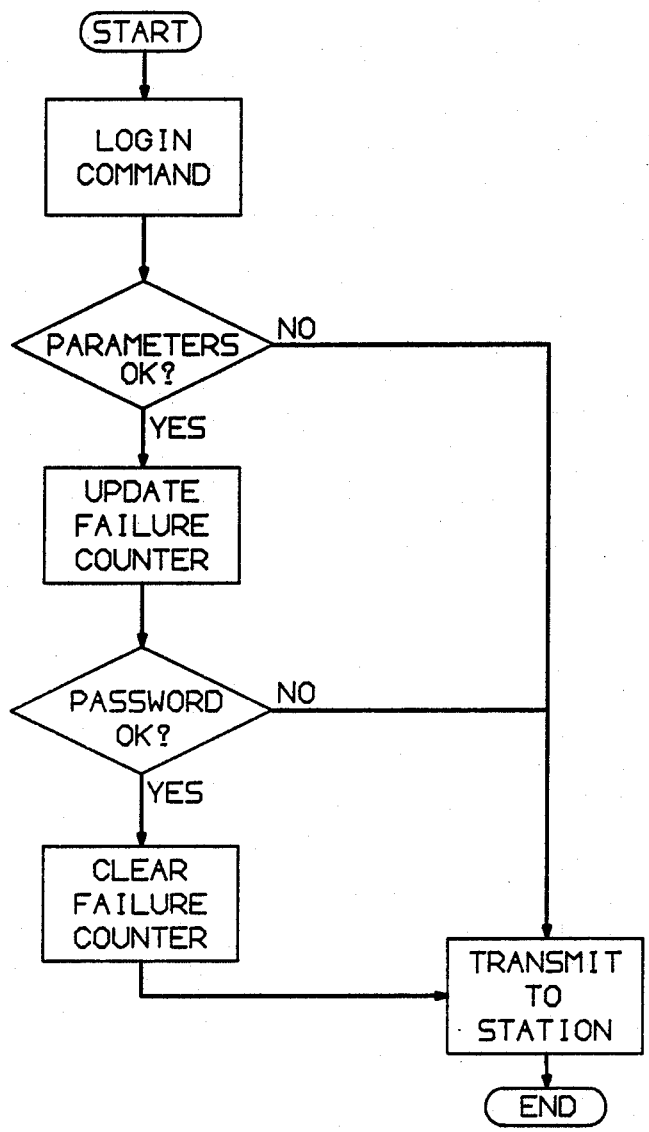
FIG. 7 depict a flow chart illustrating a login sequence which aids in preventing unauthorized access to the portable data carrier.

Referring now to FIG. 7, there is shown a flow diagram of that part of the operating system on the card which aids in preventing unauthorized logins into the card. Each time a login command is accessed, the password failure counter is first updated to reflect a password failure. Next, the given password is checked against the password in the card header. If the proper password is given, the password counter is cleared. This feature prevents sophisticated brute force attacks on the password by equipment which could remove power from the card after unsuccessful login attempts but before the failure counter could be updated to reflect the failure.

To aid in the development of application software, a high level software library has been created to support all interactions between the station and the reader/- writer and also between the station and the card. As a result, an application programmer does not need to be concerned with the tedious details of the card internals or the communication protocol. His code interfaces directly with the library and the library interfaces with the card.

The library is divided into four sections: a card library section which provides for direct mapping of card commands such as those shown in FIG. 6, a reader/writer library section which provides for direct mapping of reader/writer commands, a compound library section which contains card and/or reader/writer commands, and finally a control section which contains common control functions located on the station. These functions include details of initialization, termination and control of ports and logical devices. This library thus functions as a software interface and provides a way to access devices and files that closely resembles typical computer protocols and eases the burden on the application programmer.

Allocation of records, deallocation of records and garbage collection are provided for in the operating system of the card. When information is deleted from a file, the card returns any released records to the available pool of records and arranges in linear order the utilized records by performing a garbage collection. Through this garbage collection, all unused records on the card are collected at the end of the card memory. Allocation of additional records, as required, is automatically performed when a write goes beyond the last record of a file. By always maintaining the available records at the end of the card, new records for a file are always allocated past the previous end of the file thereby maintaining the linear order of the records of each file.

Information as to the allocation and deallocation of records is not available to the application at the station. Security is enhanced since the application merely sees contiguous data without any implementation details. Nor is direct access to the application files in raw format permitted to users having access to those commands found in the Normal Security Class level. Access to the entire card is permitted only to the users having access to the commands found in the Extended Security Class level to insure tight security during card production and testing.

Figure 8:
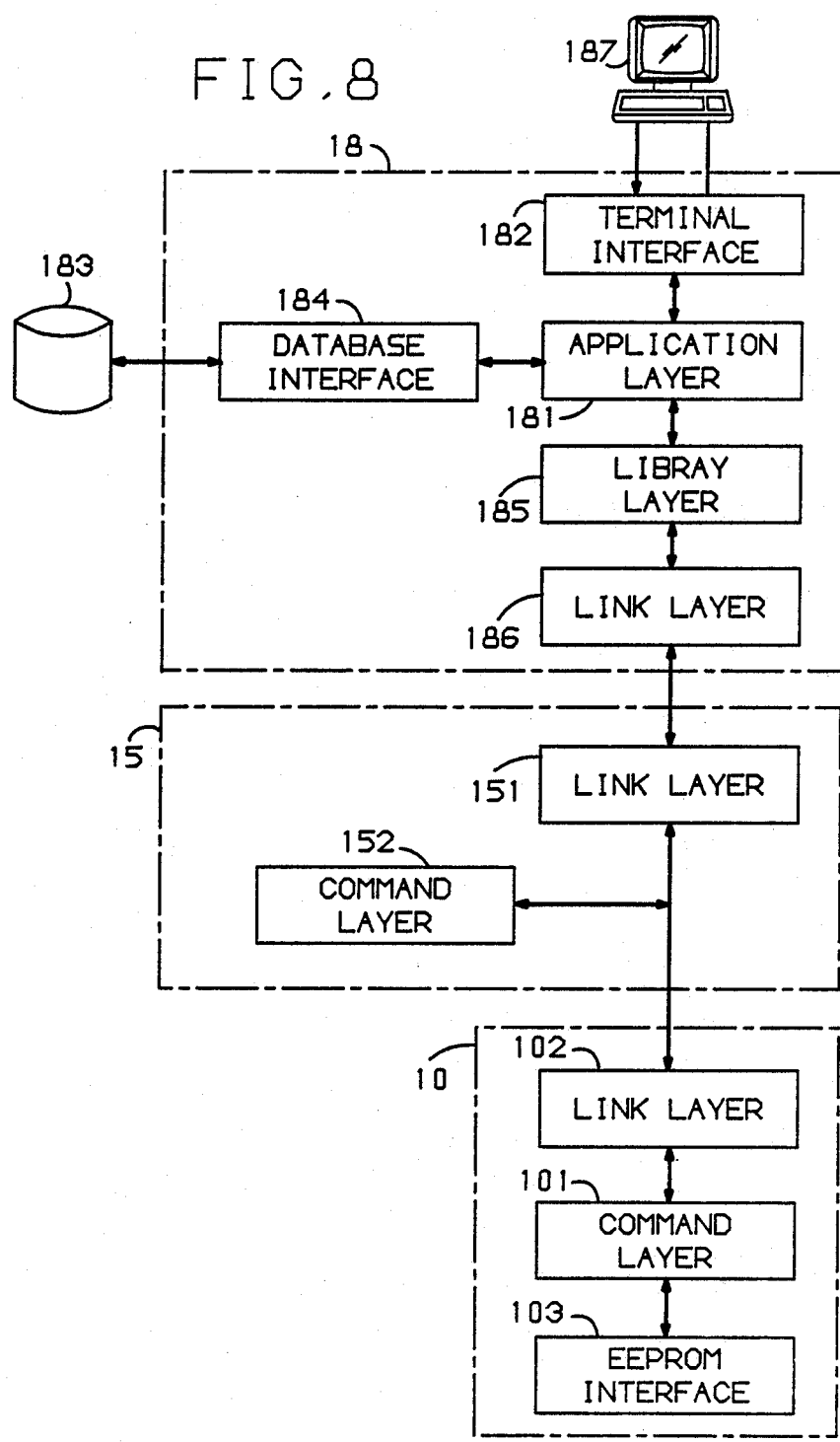
FIG. 8 shows the software hierarchy of the portable data carrier system arranged for operation in the protocol employed in the system.

Referring now to FIG. 8, there is shown the software hierarchy arranged for operation in the communications protocol of the PDC system. An application layer 181 within the station 18 interfaces with the card 10 and also with the user at a terminal 187 through a terminal interface 182 or to an optional database through a database interface 184. To simplify access to the card 10, the application layer 181 interfaces with the library layer 185 discussed herein above. This in turn interfaces with the link layer 186 which handles the actual transactions with the reader/writer 15 and the card 10.

Figure 9:
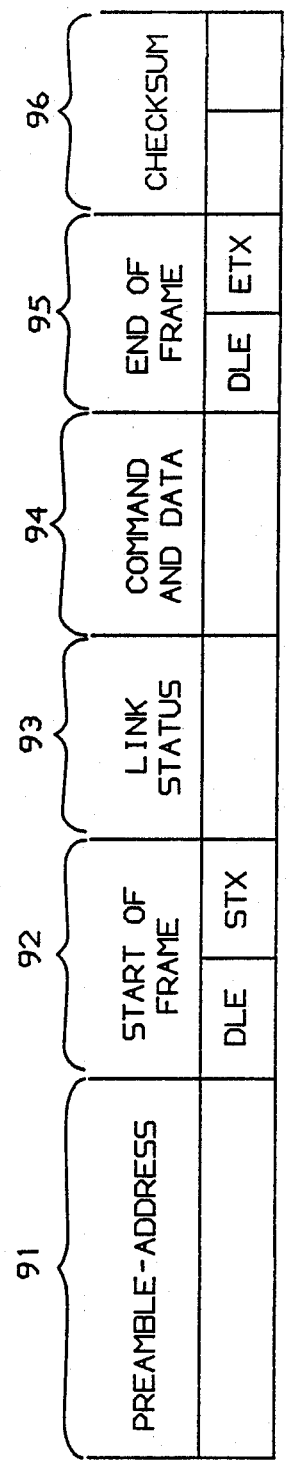
FIG. 9 illustrates a message format suitable for use in communications between the major subsystems of the portable data carrier system.

Although the station 18 is connected through a serial port to the reader/writer 15, it communicates directly with the card 10 as well as with the reader/writer 15. Every message which is intended for the card 10 is therefore transparently forwarded through the reader/writer 15 to the card 10. The destination address is found in the preamble section of the message. A message format suitable for use in the present invention is shown in FIG. 9 and described in greater detail later herein.

The reader/writer 15 and the card 10 both implement the same half-duplex communication protocol with the station at the data link layer 186. The card 10 is fully passive and not able to initiate any transaction with the station 18. The reader/writer 15 differs, in one aspect, in that it is able to signal 'attention' to the station via a carrier detect lead in the serial port connecting the two. The station 18 responds to the 'attention' signal after completing any present transaction in which it is then involved. The station next interrogates the reader/writer 15 to determine the reason for the 'attention' signal. An example of when the reader/writer 15 would provide such an attention signal is when the card 10 is inserted in an accommodating slot (not shown) on the reader/writer 15 and in position for communicating with the station 18. A second example would be when the card 10 is removed from slot in the reader/writer 15.

The reader/writer has two layers, a link layer 151 and a command layer 152. The link layer 151 acts as the transparent medium between the station 18 and card 10 passing commands or responses therebetween. The link layer 151 in the reader/writer 15 also provides buffering and baud rate conversion, as necessary. The transmission rate between the card 10 and the reader/writer 15 is maintained at 191200 baud. If the baud rate between the station 18 and the reader/writer 15 is slower than the baud rate between the reader/writer 15 and the card 10, the reader/writer 15 provides the baud rate conversion and buffers the message such that it is sent to the card as a block of contiguous data. The second layer in the reader/writer is the command layer. This layer is in the reader/writer for responding to those commands specifically addressed to the reader/writer from the station 18.

Data in the protocol is sent over the communication link in a serial manner, character by character. A character is framed with one start bit and one stop bit. Messages of contiguous blocks of characters are initiated at any time within the constraints of the half-duplex protocol. The station 18 and the reader/writer 15 or the card 10 exchange information in a predefined message packet. A packet contains control information as to where the data begins and ends in the packet and also contains information for checking the message data integrity.

Referring now to FIG. 9 in greater detail, and in combination with FIG. 8, there is shown a message format suitable for use in the present invention wherein the station 18 addresses the reader/writer 15 or the card 10. The message format consists of a preamble 91 for addressing the reader/writer 15 or card 10 and a start-of-frame control sequence 92 for marking the beginning of the message (DLE STX). Next in the message format is the link status 93 which contains information as to either acknowledgment (ACK) or negative acknowledgment (NAK) of the message transmitted, information as to whether an error occurred during transmission, and a sequence number (tag) of the current message. Every message is assigned a sequence number. A modulus 8 scheme is employed in the message format using the three least significant bits in the link status byte.

Next is the command and data field 94 which contains the transmitted data followed by an end-of-frame control sequence 95 marking the end of a message (DLE ETX). Finally a two byte checksum 96 is generated by applying an algorithm described in an article entitled "An Arithmetic Checksum for Serial Transmissions," J. G. Fletcher, IEEE Transactions on Communications, Volume Com-30, Jan. 1982. pp. 247–252.

A message packet response provided back to the station 18 from the reader/writer 15 or from the card 10 is identical to the message packet generated by the station. The message format depicted in FIG. 9 is thus applicable to communications between all of the subsystems. The preamble of a message transmitted from the station 18 consists of 8 bytes. A message is considered received correctly by the station 18 if at least three of these consecutive preamble characters are detected by the sub-system to which it is then attempting to communicate.

To initialize communication with either the reader/writer 15 or card 10, the station 18 sends a 'link reset' message. Communication fails if the station receives a NAK or a predetermined time expires before a response is received.

Once communication with the reader/writer 15 is established, the reader/writer informs the station 18 when the card 10 is inserted or if the card is already present. After the card 10 is inserted, the reader/writer 15 signals 'attention' to the station 18. When the station determines that the inserted card is a smart card rather than, for example, a card having only a magnetic stripe, the station sends a link reset message to the card to initialize it. Once initialized, the card awaits commands from the application layer 181 in the station 18. When a request is received, it is processed by a command layer 101 in the card 10 and a response is sent back to the station 18 while the card 10 waits for the next command. The station 18 can arbitrarily choose which subsystem to address and what message to send, i.e. either link reset or a command.

Figure 10:
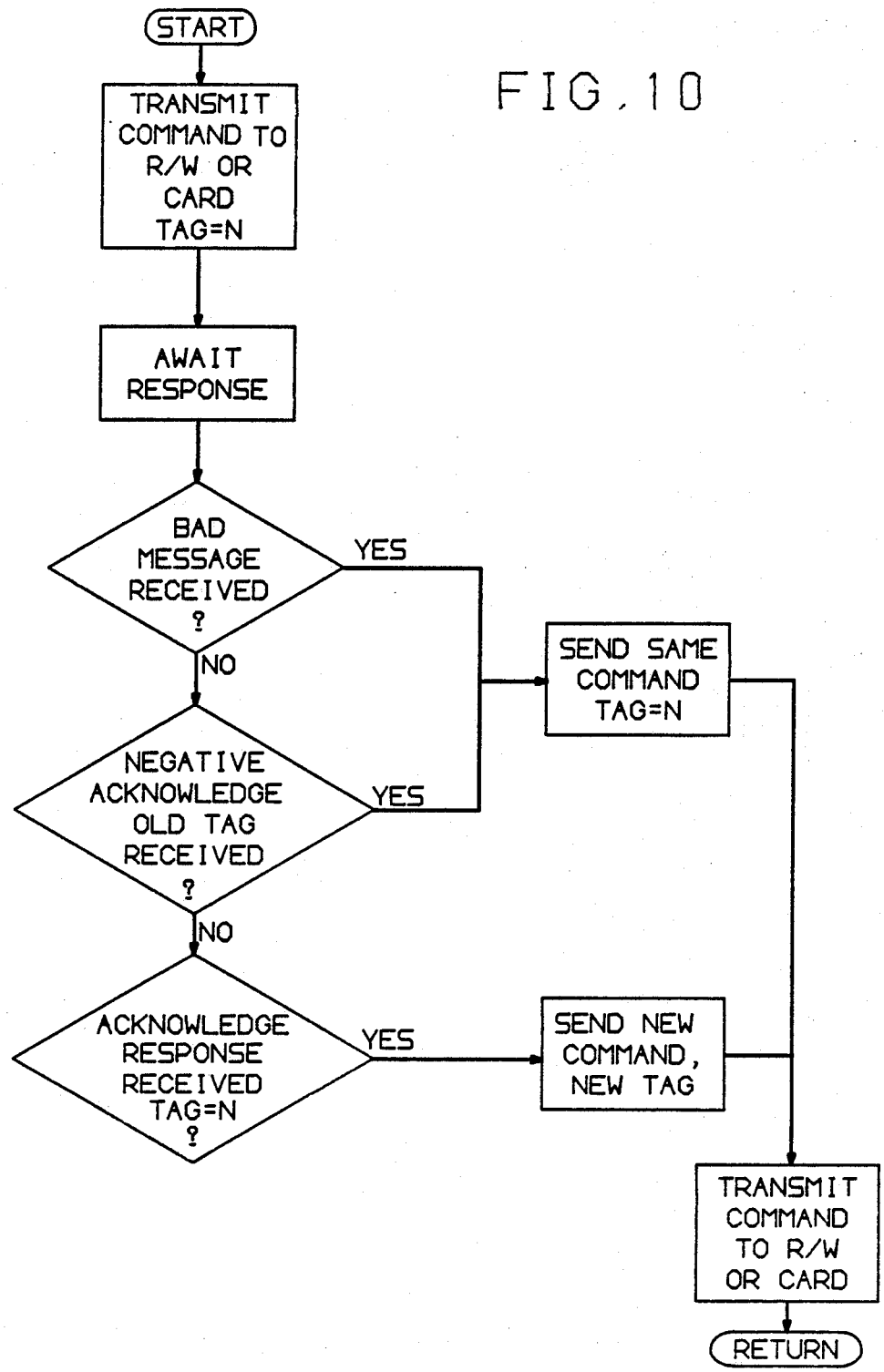
FIG. 10 depicts a flow chart illustrating the link layer decision making process for operation of the application station in a half-duplex protocol.

FIG. 10 is a flow chart illustrating the link layer decision making process for the station 18. In communicating with the reader/writer 15 or the card 10 during a normal transaction, the station 18 sends a message and sets up a timer. Next, the station either receives a response from the subsystem it is then attempting to communicate with or the timer expires. If the link status byte in the message response to the station contains an ACK, this reflects that the transaction has been completed successfully and the tag value is incremented to modulus 8. The response is then provided to the application layer 181 in the station 18.

If a negative acknowledge or NAK is received, at least two more link retries are attempted and the tag value stays the same. The station does not ask for a retransmission, rather it transmits the last command. If an acknowledge or ACK is not received after three tries, link level error recovery is initiated.

Figure 11:
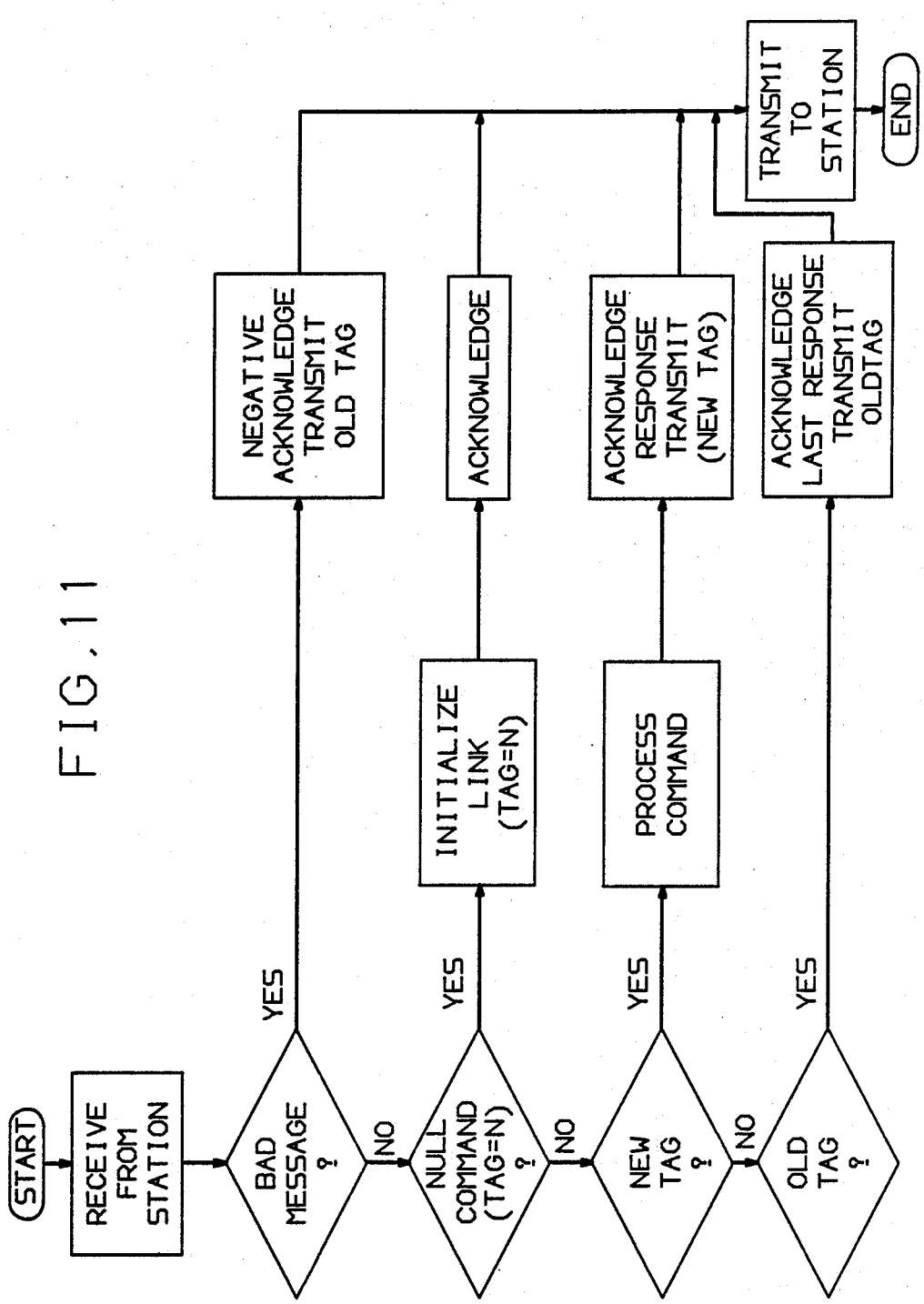
FIG. 11 depicts a flow chart illustrating the link layer decision making process for operation of both the reader/writer and the portable data carrier in a half-duplex protocol.

FIG. 11 is a flow chart illustrating the link layer decision making process for both the reader/writer 15 and the card 10. Referring to both FIG. 8 and FIG. 10, in communicating back to the station during a normal transaction, the reader/writer 15 or the card 10 observes the tag for each message it receives to decide if the current request is a new transaction, or a retransmit request for the previous one. If the current tag value is different from the tag value of the previous transaction then the incoming message is treated as a new transaction. If the current tag value equals the previous tag value then a retransmission is being requested by the station 18. The reader/writer 15 or card 10 always responds with the tag associated with the last valid command it has processed. Thus if a present transmission fails i.e. 'bad message' the link layer responds with negative acknowledge (NAK) and the last valid tag. A 'null' command causes the reader/writer 15 or card 10 to reset it's sequencing tag to the tag it receives. On reset, the reader/writer 15 or card 10 initiates the tag to an invalid value to insure that the incoming message is treated as a new one.

Termination of a session with a card 10 may be initiated by the station 18 requesting the reader/writer 15 to turn off power to the card 10 or by the user pulling out the card 10. In the latter case, the reader/writer 15 automatically stops powering the empty card slot and signals 'attention' to the station 18. The station then sends a 'status request' command to the reader/writer 15. In its response, the reader/writer 15 notifies the station 18 that the card 10 has been pulled out and the link layer reports communication errors to the application layer after the three unsuccessful attempts to communicate with the card 10. This is necessary since only the application layer can declare the reader/writer as inactive.

What is claimed is:

1. A portable data carrier system comprising:
   a portable data carrier for storing and processing alterable data, the portable data carrier including both a computer for providing an executive operating system on the portable data carrier and an alterable memory for providing data to the computer for operating the executive operating system, the executive operating system providing a data input/output interface means for the portable data carrier, and creating multiple files in a data segment region of the alterable memory for storing the alterable data associated with each file, the size of each file and placement of the data for each file in the data segment region being controlled by the executive operating system and the data for each file being allocatable at any of multiple available locations throughout the data segment region by the executive operating system;
   an application station for processing data from the portable data carrier; and
   communication means for providing communications between the application station and the portable data carrier, the application station communicating with the portable data carrier over the communication means through command primitives, responsive to the command primitives, the executive operating system accessing the alterable data for reading therefrom and writing thereto, and providing this data to the application station via the communication means.

2. The portable data carrier system of claim 1 wherein the communications means includes a portable data carrier reader/writer, the reader/writer providing an interface for coupling data between the application station and the portable data carrier.

3. The portable data carrier system of claim 1 wherein the portable data carrier further includes a header region in the alterable memory, the header region containing a first password for verifying the identity of an individual attempting to access the data in the portable data carrier.

4. The portable data carrier system of claim 3 wherein access to each file for a desired transaction is controlled by a second password assigned to an individual authorized to conduct transactions within the portable data carrier.

5. The portable data carrier system of claim 4 wherein each file in the portable data carrier includes files permission information for defining the type of access permitted to an individual.

6. The portable data carrier system of claim 5 wherein the file permission information in the portable data carrier includes read permission, write permission and append permission, a first file having read permission allowing an individual to only read data therein, a second file having write permission allowing an individual to read data therein and write data thereto, and a third file having read and append permission allowing an individual to only read data therein and append data thereto.

7. The portable data carrier system of claim 6 further including multiple security levels hierarchically arranged in a manner to comprise a least secure level, a most secure level and multiple other security levels interposed therebetween, access to each security level being controlled by a corresponding password assigned only to an individual authorized to access the, data at that security level.

8. The portable data carrier system of claim 7 wherein the file permission information is assignable according to security level, a first higher order security level having permission to read data in and write data to the second file and a second lower security level having permission to only read data in the second file.

9. The portable data carrier system of claim 7 wherein the file permission information is assignable according to security level, a first higher order security level having permission to read data in and write data to the second file and a second lower security level having permission to read data in and only append to the data in the second file.

* * * * *